No. 639,844. Patented Dec. 26, 1899.
J. BROWN.
WASHBOILER.
(Application filed May 31, 1899.)
(No Model.)
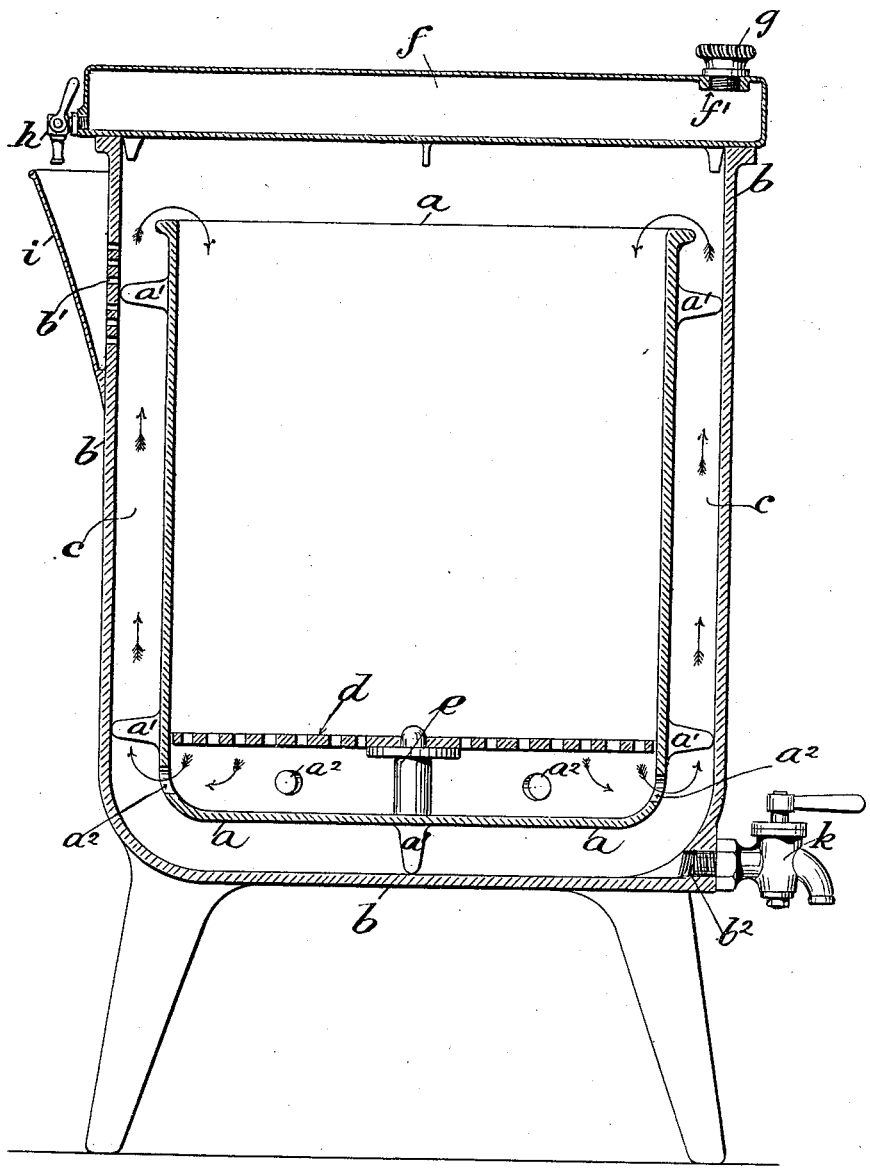
WITNESSES:
Ella L. Giler.
INVENTOR
Jacob Brown,
BY
Richards
ATTORNEYS.
THE NORRIS PETERS CO., PHOTO-LITHO., WASHINGTON, D. C.

UNITED STATES PATENT OFFICE.

JACOB BROWN, OF MANCHESTER, ENGLAND.

WASHBOILER.

SPECIFICATION forming part of Letters Patent No. 639,844, dated December 26, 1899.

Application filed May 31, 1899. Serial No. 718,877. (No model.)

*To all whom it may concern:*

Be it known that I, JACOB BROWN, a subject of the Queen of Great Britain, residing at Manchester, in the county of Lancaster, England, have invented new and useful Improvements in and Connected with Boilers for Washing, of which the following is a specification.

This invention relates to improvements in boilers for washing, and has for its object to provide means whereby a continuous circulation of the water and cleansing agent through the boiler and articles to be washed is obtained, and thereby the washing accelerated and a great deal of work obviated. I attain these objects by the mechanism illustrated in the accompanying drawing, which shows a vertical section of a boiler constructed in accordance with my invention and marked with letters of reference.

In carrying out my invention and referring to the drawing I employ two vessels $a$ and $b$ of suitable size and shape, one inside the other in such a manner as to leave a space $c$ all around the inner vessel $a$ for the circulation of the water and cleansing agent through the said space and inner vessel. The inner vessel $a$ is kept in position in the outer vessel $b$ by being formed externally with bulges or projections $a'$, bearing against the interior of the outer vessel $b$, or vice versa.

To facilitate the circulation of the water and cleansing agent from the inner vessel through the space $c$ or outer vessel $b$ into the inner vessel again, a suitable number of holes $a^3$ are formed near the bottom in the side of the inner vessel $a$, and to prevent the articles under operation in the latter obstructing the said holes I employ above the same a perforated bottom $d$, placed upon a distance-stud $e$, employed on the bottom of the outer vessel $b$.

Upon the top of the outer vessel $b$ I employ a hollow lid $f$, furnished with an inlet $f'$, closed by a plug $g$, and with an outlet or tap $h$, arranged over a spout $i$, formed on the outer vessel $b$ over perforations $b'$ in the latter. This lid serves as a lid for the outer vessel $b$ and as a hot-water-supply cistern for the said vessels and automatically compensates for the evaporation of the water that takes place in the vessels $a\ b$ during the boiling or washing operation, the cold water poured into the lid-cistern $f$ being heated by the steam in the vessels $a\ b$ impinging upon the bottom of the lid or cistern $f$. The said outlet or tap and spout together form a sight-feed, and the latter serves also to indicate the level of water in the vessels and which may be easily regulated by the said tap.

In order to permit of drawing off a portion of the dirty water from time to time or emptying the boiler completely, an outlet $b^2$, furnished with a tap $k$, is formed at the bottom of the outer vessel $b$.

The boiler described may be built into brickwork or provided with legs, as shown in the drawing, used separately and heated by coal or gas or any other suitable fuel.

What I claim as my invention, and desire to secure by Letters Patent, is—

1. In combination, the outer vessel having a spout projecting from its side, an inner vessel having projections $a'$ extending from its sides and bottom to space the same from the outer vessel, the distance-stud projecting up from the bottom of the inner vessel and the perforated bottom held on the distance-stud, said inner vessel having an opening at or near the bottom thereof below the perforated bottom, substantially as described.

2. In combination, the outer vessel, a water-compartment completely closing the top thereof, an inner vessel supported from the outer vessel, and outlet leading from said water-compartment, a spout projecting from the side of said outer chamber below said outlet, the mouth of said spout being above the upper edge of said inner chamber and openings in the side wall of said chamber forming a communication with said spout below the upper edge of said inner chamber, substantially as described.

In witness whereof I have hereunto set my hand in presence of two witnesses.

JACOB BROWN.

Witnesses:
 ALFRED BOSSHARDT,
 STANLEY E. BRAMALL.